Sept. 21, 1954  W. C. HAVENS  2,689,708
TRACTOR JACK
Filed Jan. 26, 1953
2 Sheets-Sheet 1
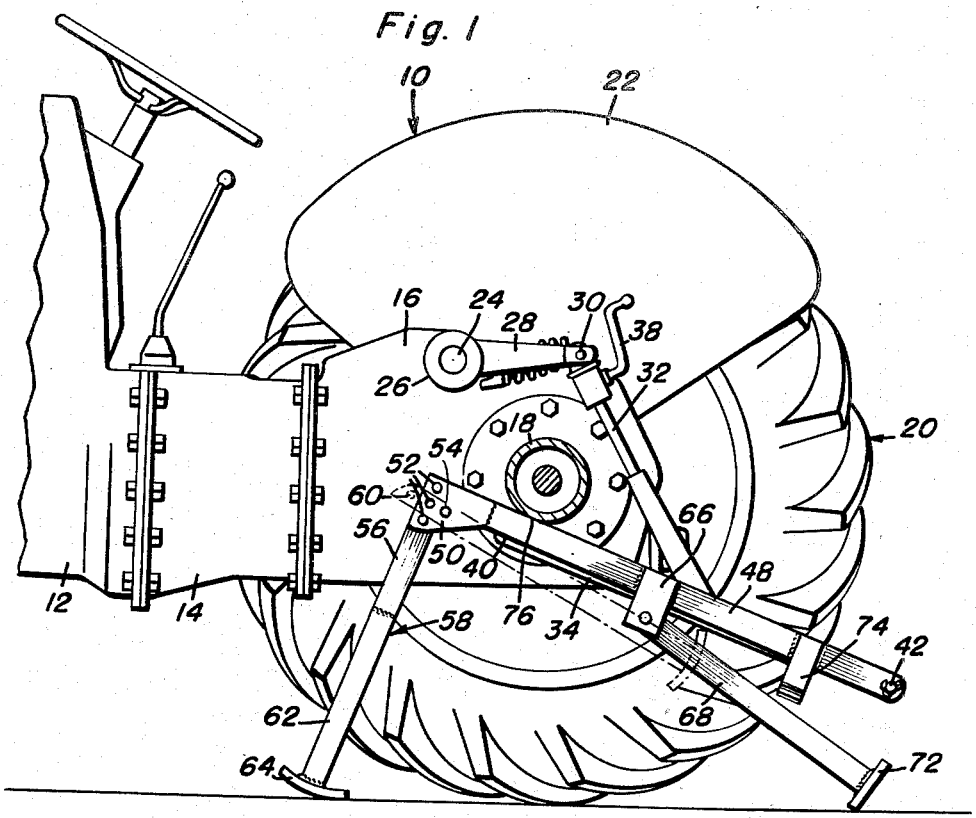
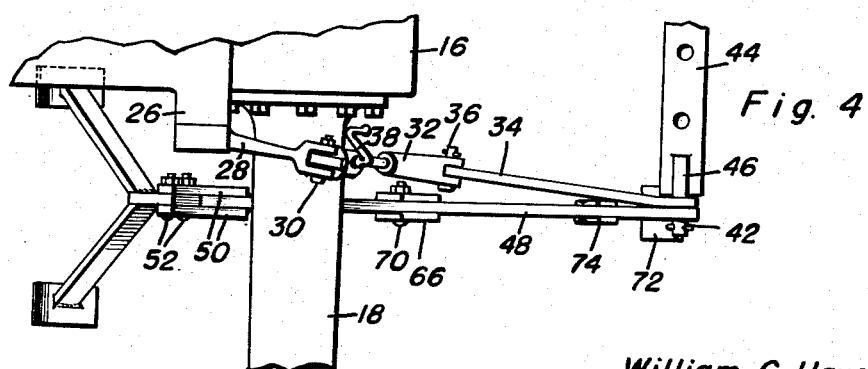
William C. Havens
INVENTOR.

Sept. 21, 1954     W. C. HAVENS     2,689,708
TRACTOR JACK

Filed Jan. 26, 1953     2 Sheets-Sheet 2

William C. Havens
INVENTOR.

Patented Sept. 21, 1954

2,689,708

UNITED STATES PATENT OFFICE 2,689,708

TRACTOR JACK

William C. Havens, Pampa, Tex.

Application January 26, 1953, Serial No. 333,079

2 Claims. (Cl. 254—124)

This invention relates to jacks and more particularly to a jack for use with tractors of the type having a hydraulically operated draw bar.

An object of this invention is to provide a tractor jack which is readily installed and which requires a minimum of manual effort.

Another object is to provide a jack for use with tractors of the type described wherein movement of the draw bar functions through the principle of leverage to elevate the tractor so that the wheels thereof are out of engagement with the ground.

Another object is to provide a jack attachment in accordance with the foregoing objects which does not require moving parts in its construction.

Another object is to provide a jack attachment for tractors which may be conveniently folded into a compact form for storage or transport.

Yet another object is to provide a jack embodying a supporting leg which may be positioned subsequent to initial lifting by the jack so that the jack functions as a self-sustaining stand.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical elevation through the axle housing of a tractor utilizing the novel jack attachment and showing the attachment in position prior to lifting;

Figure 4 is a plan view of a portion of the tractor showing the manner of attachment between the tractor and jack.

Figure 2:
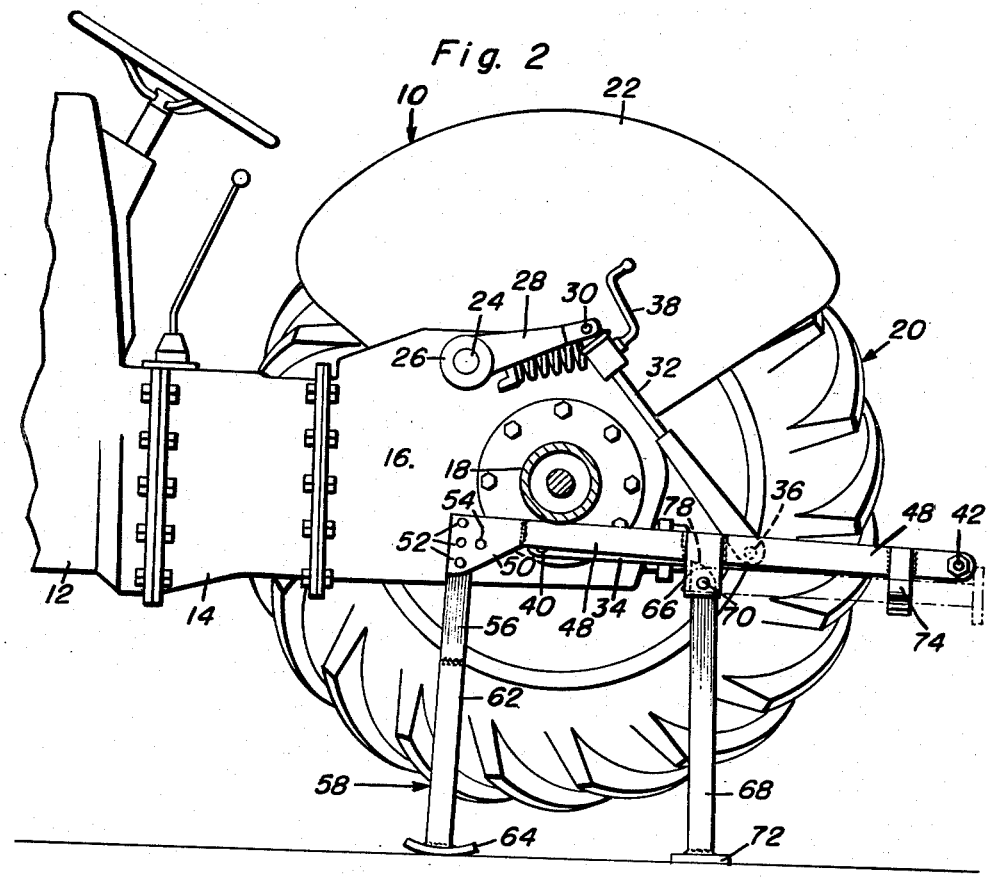
Figure 2 is a vertical elevation similar to Figure 1 but showing the tractor in elevated position.

With reference now particularly to the drawings, numeral 10 indicates generally a tractor structure having an integral frame comprising various housings or elements, such as main body and engine housing 12, transmission housing 14, final drive and power take-off housing 16 and rear axle housing 18. The various housings or frame elements are secured together in the usual well known manner, as clearly illustrated. Conventionally secured to the opposite ends of the axle housing are the usual wheel assemblies indicated generally at 20, and, if desired, mud guards 22 may be provided for the wheels.

The final drive housing includes a hydraulically driven shaft 24 extending oppositely therefrom through the shaft bosses 26 and to which are feathered or suitably secured a pair of lifting links 28. Pivotally connected, as at 30, to the free ends of these links are a pair of connecting members 32 which are pivotally connected at their opposite ends to draw bar links 34 by pivot pins 36. For the purpose of lengthening or shortening the links 32, cranks 38 and operating mechanism (not shown) are provided.

Figure 3:
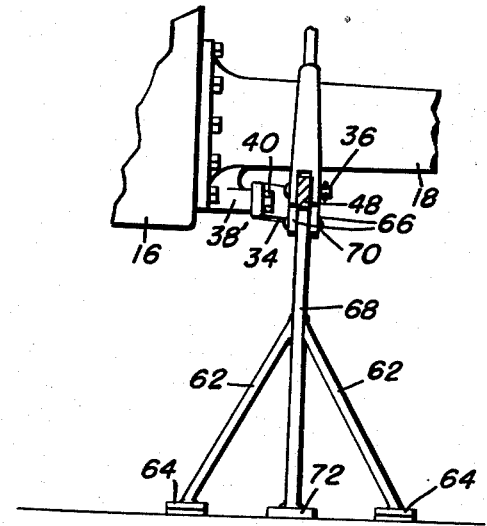
Figure 3 is a vertical elevation from the rear of the tractor showing a portion thereof and the jack attachment in operative position.

As best shown in Figure 3, draw bar links 34 are pivotally connected at one end thereof to axle bosses 38' within which pivot bolts 40 are threadedly engaged. The other ends of the draw bar links are connected through pivot pin 42 to a draw bar 44 to which the pivot pins are welded, as at 46, or otherwise suitably secured.

The foregoing structure is conventional in nature and exemplifies one type of hydraulically operated tractor draw bar now currently in use and it is to be understood that this construction forms no part of this invention, the particular elements shown and described herein being merely for the purpose of clarification and for clearly setting forth the type of structure with which the novel jack attachment is to be used. In this conventional tractor structure, suitable means (not shown), usually hydraulic, are incorporated in the tractor power system for imparting rotational movement to the shaft 44 and, consequently, to the linkage 28, 32, 34 and 44. Numerous farming attachments and implements have been manufactured and designed for use with this type of draw bar structure and since their use is well known and immaterial to the operation of this invention, further discussion of the conventional tractor assemblage is unnecessary.

Referring now more particularly to Figure 4, it will be seen that draw bar pin 42 also pivotally carries one end of a lifting bar or arm 48 which extends forwardly therefrom below the axle housing 18 and forwardly thereof. The forward end of bar 48 carries a pair of spaced brackets 50 welded or otherwise secured thereto. These brackets are provided with a plurality of vertically aligned apertures 52 and a single horizontally spaced aperture 54 and for a purpose presently apparent, holes 52 are evenly spaced and hole 54 is correspondingly spaced from one of the holes 52. An upper end portion 56 of a jacking leg assembly 58 is received between brackets 50 and has longitudinally aligned holes 60, one of which is shown in dotted lines in Figure 1, which register with hole 52 in the bracket. Suitable fastening means 52 extend through the holes in the bracket and the jacking leg assembly to secure them together in right angular relation, as shown in full lines in Figures 1 and 2. When the jack attachment is not in use, the fastening means may be removed from the two end holes and the leg assembly pivoted about the central fastening means to the dotted line position shown in Figure 1 wherein one of the holes in the leg assembly will be aligned with hole 54 in the bracket so that one of the fastening means may be inserted therethrough to maintain the bar and leg assembly in folded relation presenting a compact unit for transport and storage. The leg assembly also includes a pair of divergent legs 62 having arcuate ground engaging plates 64 welded at their lower ends for a purpose hereinafter described.

Intermediate the ends of the bars 48 are another pair of brackets 66 between which is pivotally secured one end of a supporting leg 68. For this purpose, a rivet or pivot pin 70 is provided and welded to the opposite end of these legs are ground engaging plates 72. A pair of spring clamps are welded adjacent the draw bar end of bars 48, as indicated at 74, and it will be apparent that such clamps serve to maintain the supporting legs in folded position adjacent the bar as shown in dotted lines in Figure 2.

In operation, the device functions in the following manner. When it is desired to elevate the tractor, the jack attachment is connected to the draw bar pin and leg assembly 58 is secured to the bar 48 in right angular relation with the draw bar assembly fully depressed or lowered, as shown in Figure 1. Supporting leg 68 is forced out of engagement from between the clamp 74 and is allowed to rest on the ground as shown. In this position, it will be seen that bar 48 abuts a portion of the axle housing 18, as indicated by the numeral 76 and it will be apparent that when the draw bar assembly is lifted through the hydraulic mechanism, bar 48 will lever the axle housing, and consequently, the tractor, upwardly and when a point is reached wherein supporting leg 68 is disposed substantially perpendicular to the bar, further lifting will be unnecessary as the jack attachment will then serve to function as a stand or self-sustaining support for the tractor. It will be understood that either a single jack attachment or a double assembly may be used, as desired. Obviously, a single attachment will lift only that wheel of the side to which it is attached, whereas use of an attachment on either side of final drive housing 16 will simultaneously lift both rear wheels of the tractor. Also, it will appear that during the jacking operation, there will be a limited forward movement of the tractor and that for securing most efficient contact with the ground during such operation, ground engaging plate 64 is arcuately formed. It will also be clear that supporting leg 68 will remain in contact with the ground during the jacking operation by virtue of its own weight and that when it has assumed the position shown in full lines in Figure 2, a corner of its upper end will abut bar 48, as indicated at 78, to prevent further pivoting between the bar and the supporting leg past the position shown. Obviously, the other corner of the leg is rounded off as shown to allow pivotal motion in the direction desired.

From the foregoing, it will be readily appreciated that the jack attachment described presents a rapid and efficient means for lifting a wheel or wheels of a tractor from the ground and that the attachment, when in finally operative position, provides a rigid and self-sustaining stand upon which the tractor is securely supported. Since there are no complex moving parts in this attachment, it is of extremely durable and trouble-free construction and lends itself to repeated use without service requirements.

During normal farm operation of a tractor, it is frequently desirable to change wheel and tire assemblies during the course of a day. This is necessary when various tire tread patterns are variously required, as is most frequently encountered during plowing operations or the like when varying conditions of terrain and soil conditions demand the use of several different types of tread. Also, the jack attachment provides a convenient support for the tractor during repair thereto for any purpose whatsoever and it is clear that the attachment is of value not only to the farmer in the field but also to the repairman in his shop.

It is to be understood that the specific construction shown and described need not be strictly adhered to, as other equivalent constructions may serve equally as well. For example the lifting leg assembly 58 need not necessarily employ a pair of divergent legs, but may take the form of a single leg, in which case it would be desirable, although not necessary, to employ such an attachment on either end of the draw bar assembly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A combined jack and stand for tractors having a hydraulically operated draw bar, comprising a lifting bar adapted to be pivotally secured at one end to the draw bar and having a first and second aperture spaced vertically a predetermined distance and a third aperture spaced horizontally from said second aperture a corresponding distance, an elongated ground engaging member provided with a pair of longitudinally spaced holes registerable with said first and second apertures, fastening means extending through said first and second apertures and said holes to secure the bar and member in right angular relation, the fastening means extending through said first aperture being removable whereby said member may be pivoted about the other fastening means to a position wherein said first aperture and one of said holes are in register.

2. The combination of claim 1 wherein a supporting leg is pivotally connected to said bar intermediate said ends.

References Cited in the file of this patent

UNITED STATES PATENTS

| Number | Name | Date |
| --- | --- | --- |
| 748,127 | Williams | Dec. 29, 1903 |
| 2,590,361 | Arnold | Mar. 25, 1952 |

FOREIGN PATENTS

| Number | Country | Date |
| --- | --- | --- |
| 688,435 | France | May 12, 1930 |
| 592,175 | Great Britain | Sept. 20, 1947 |
| 269,593 | Switzerland | July 15, 1950 |